(12) United States Patent
Maslen et al.

(10) Patent No.: US 7,865,129 B2
(45) Date of Patent: Jan. 4, 2011

(54) EARLY LEARNING BOOK SYSTEM WITH INTERNAL, ELECTRONIC MEDIA ACTIVITY, SUCH AS LIGHTING AND SOUND ACTIVITY

(76) Inventors: Bobby Lynn Maslen, 4325 SW. 34th Ave., Portland, OR (US) 97201; John Maslen, 4325 SW. 34th Ave., Portland, OR (US) 97201; Jon M. Dickinson, 8015 SE. 31st Ave., Portland, OR (US) 97202

( * ) Notice: Subject to any disclaimer, the term of this patent is extended or adjusted under 35 U.S.C. 154(b) by 602 days.

(21) Appl. No.: 11/588,892

(22) Filed: Oct. 27, 2006

(65) Prior Publication Data

US 2007/0105075 A1 May 10, 2007

Related U.S. Application Data

(60) Provisional application No. 60/733,577, filed on Nov. 4, 2005.

(51) Int. Cl.
*G09B 11/00* (2006.01)
(52) U.S. Cl. .................. 434/317; 434/336; 434/362
(58) Field of Classification Search .................. 434/118, 434/317, 323, 362, 336, 350
See application file for complete search history.

(56) References Cited

U.S. PATENT DOCUMENTS

| | | | | |
|---|---|---|---|---|
| 4,820,167 A | * | 4/1989 | Nobles et al. | 434/336 |
| 4,884,974 A | * | 12/1989 | DeSmet | 434/317 |
| 5,167,508 A | * | 12/1992 | Mc Taggart | 434/317 |
| 5,174,759 A | * | 12/1992 | Preston et al. | 434/317 |
| 5,209,665 A | * | 5/1993 | Billings et al. | 434/169 |
| 5,290,190 A | * | 3/1994 | McClanahan | 434/317 |
| 5,407,357 A | * | 4/1995 | Cutler | 434/335 |
| 6,091,930 A | * | 7/2000 | Mortimer et al. | 434/362 |
| 6,525,706 B1 | * | 2/2003 | Rehkemper et al. | 345/87 |
| 6,788,283 B1 | * | 9/2004 | Blotky et al. | 434/317 |
| 7,224,934 B2 | * | 5/2007 | Mullen | 434/317 |
| 2005/0260551 A1 | * | 11/2005 | Rubin et al. | 434/317 |

* cited by examiner

*Primary Examiner*—Kathleen Mosser
(74) *Attorney, Agent, or Firm*—Jon M. Dickinson, Esq.

(57) ABSTRACT

An electronic early recognition and confirmation system generally in learner-useable book-form structure including (a) pages, each including at least one lesson-specific question, and for each such question an associated field containing a plurality of nominally undistinguished, learner-selectable, image-based answers among which there is at least one best answer, (b) with respect to each such question, an invitation to a learner to respond to that question by interacting in a defined way with any selected one of the relevant field-associated answers, and (c) power-ready, electronic, interaction-response structure embedded in the book-form structure, operable, when a learner interacts with a selected answer in the relevant field, to produce a light and/or sound correctness-confirming response of one style when the selected answer is the best answer, and a light and/or sound noncorrectness-announcing response of another style when the selected answer is another, incorrect answer.

4 Claims, 2 Drawing Sheets

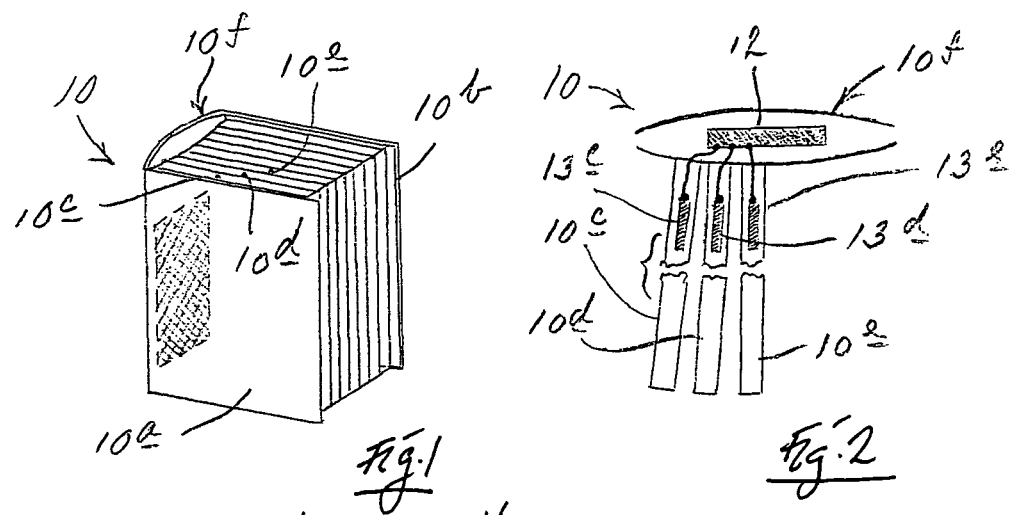
Fig. 1　Fig. 2
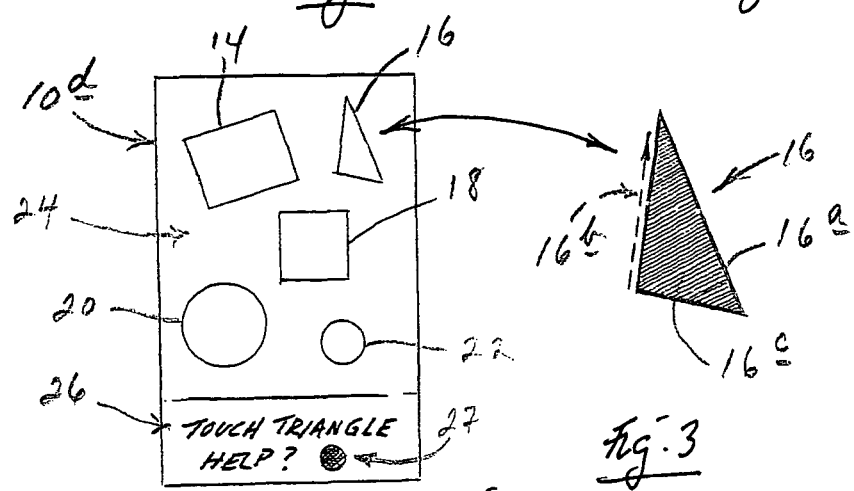
Fig. 3
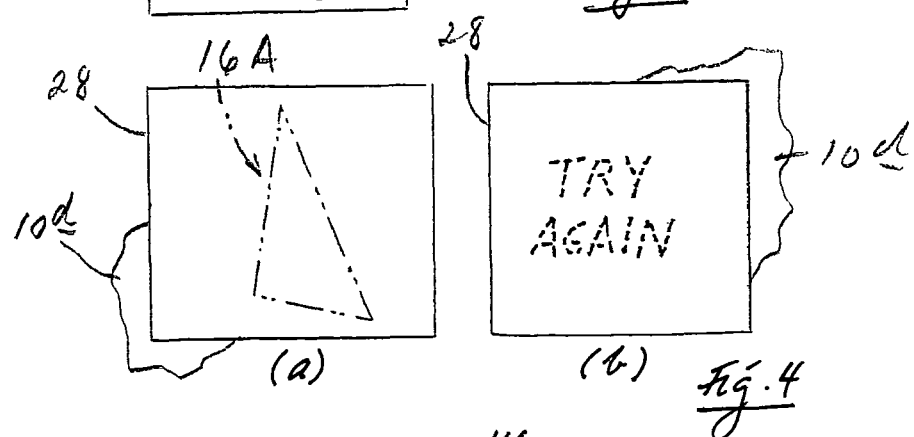
(a)　(b)　Fig. 4
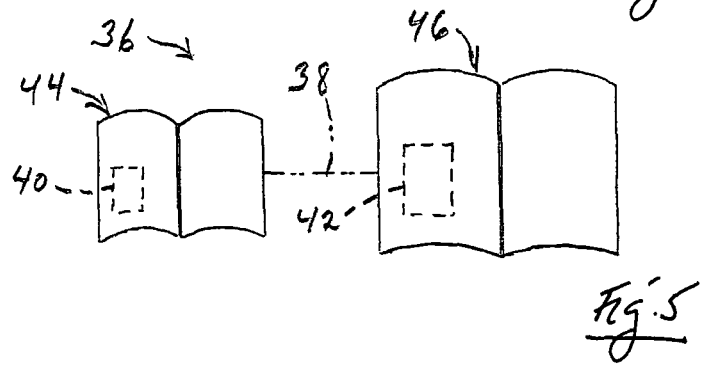
Fig. 5

EARLY LEARNING BOOK SYSTEM WITH INTERNAL, ELECTRONIC MEDIA ACTIVITY, SUCH AS LIGHTING AND SOUND ACTIVITY

CROSS REFERENCE TO RELATED APPLICATION

This application claims priority to U.S. Provisional Patent Application Ser. No. 60/733,577, filed Nov. 4, 2005, for "Early Learning Book With Internal, Electronic Media Activity, Such As Lighting Activity". The entire disclosure content of that prior-filed provisional application is hereby incorporated herein by reference.

BACKGROUND AND SUMMARY OF THE INVENTION

This invention relates to early-learning tools and practices, and in particular to a "child-operable" book-form structure, or book, in which there are embedded various appropriate powered electronic elements, such as lighting and sound elements (to generate media activity), designed to provide an attention-getting electronic response to different child-performed learning activities, such as responses to questions posed on pages in the book.

A preferred embodiment of the invention is described herein in conjunction with such a book, wherein questions on pages are posed in relation to page-appearing graphical-image answers intended to teach recognition regarding certain characteristics of these images. A learner's answer selection, made in relation to a posed question, typically by the touching of a selected graphical answer image, triggers an appropriate, immediate, attention-getting confirmatory or non-confirmatory electronic response.

In another form of the invention, in addition to there being involved a learner-useable book-form structure, there is also provided an associated teacher-useable book-form structure which is operatively connectable, preferably through a wireless digital network-type-connection, in such a fashion that a teacher can work directly in collaboration with a young learner during a question and answer use of the invention.

By way of illustration of the basic principles and structure of the present invention, implementation thereof is described herein in conjunction with several specific useful categories of early-learner subject matter, including (a) various geometric shapes, such as circles, triangles, squares, rectangles, etc., (b) various specific colors, and (c) various specific animal types. These particular topical areas which are provided for illustration and explanation purposes herein are described, as will be seen, chiefly in the context of a book structure having a page and spine arrangement wherein book pages are dimensioned to carry different kinds of lighting and/or sound devices, such as (a) miniature light-emitting diodes, (b) small loudspeakers, and (c) computer-driven electronic display screens similar to such screens which are employed today in cellular telephones. The spine portion of such a book-like arrangement may contain appropriate electrical power and logic circuitry, including a small digital computer.

The invention is also freely and easily modifiable to deal with other subject areas suitable and important for early learning, and may employ other types of incorporated electronic "media action" devices and schemes.

The various features and advantages of the invention will now become more fully apparent as the description which follows below is read in conjunction with the accompanying drawings.

DESCRIPTION OF THE DRAWINGS

FIG. 1 is a simplified, isometric illustration of a young-learner book-form structure, or book, made in accordance with one embodiment of the present invention.

FIG. 2 is a fragmentary and schematic, downward-looking plan view of a portion of the spine and thickened page structure of the book shown in FIG. 1.

FIG. 3, on its left side, illustrates a typical instructional page in the book of FIGS. 1 and 2, and on its right side, illustrates several styles of electronic lighting-response behavior which might be provided to a young learner in response to a correctly answered question posed on this page.

FIGS. 4(a) and 4(b) schematically illustrate a slightly modified version of the invention, wherein pages in a book, such as those illustrated in FIGS. 1, 2 and 3, are equipped with small, electronic, computer-driven display screens which may be used to present various parts, or all, of the content (i.e., questions and answers) provided on pages in a book-form structure constructed in accordance with the invention.

FIG. 5 is a high-level, schematic illustration of a wireless network version of the present invention, wherein a communicative interconnection is established wirelessly through a digital network between a young learner book and a companion teacher book prepared in accordance with the present invention.

DETAILED DESCRIPTION OF THE INVENTION

Figure 6:
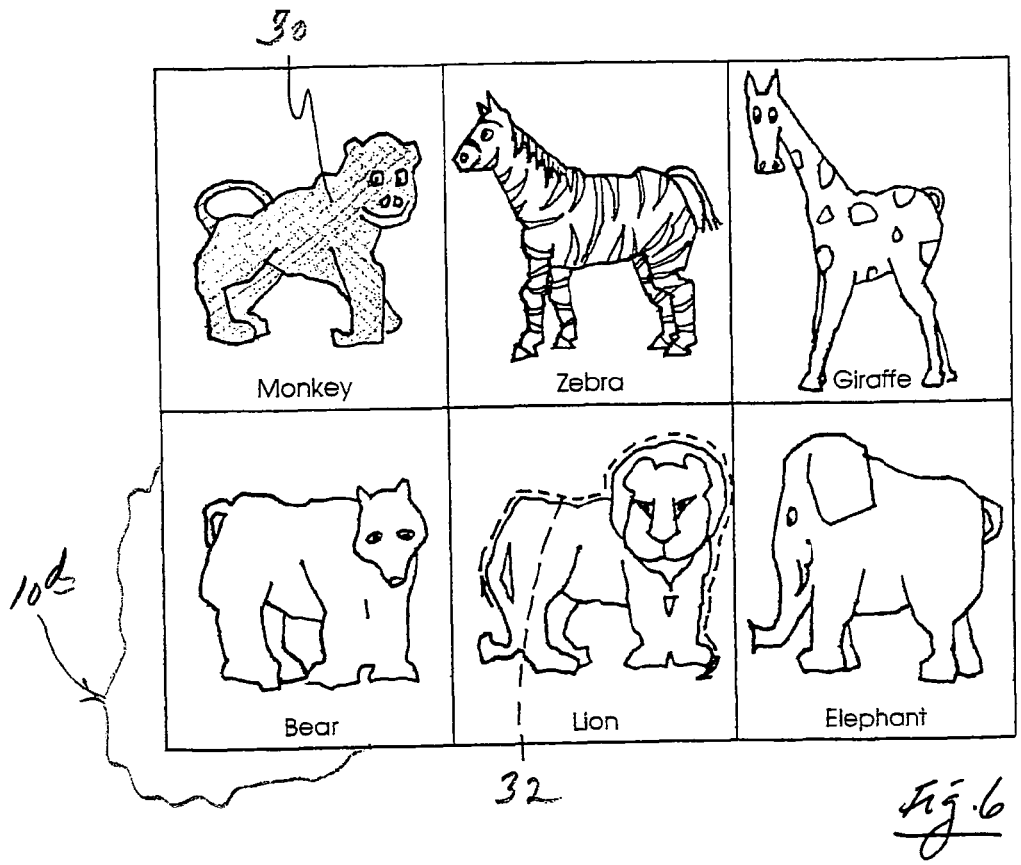
FIG. 6 is a fragmentary drawing of a book page involving questions relating to recognizable animal forms.

Turning attention now to the drawings, and referred first of all to FIGS. 1-3, inclusive, indicated generally at 10 in FIGS. 1 and 2 is a young-learner book, or book-form structure, made in accordance with one embodiment of the present invention. Book 10 herein includes front and rear covers 10a, 10b, respectively, plural, specially thickened pages, such as the three pages shown at 10c, 10d, 10e, and a spine structure 10f which binds these other components of book 10 into a unified structure.

Suitably imbedded in the page and spine structures of book 10 are a small battery-powered digital computer, or computer circuitry, 12 which resides suitably disposed within spine 10f, and in each of the appropriately constructed (suitably thickened and edge-finished), different pages in the book, combined light and sound response-signaling structure, such as the three such structures shown in schematic block forms at 13c, 13d, 13e appropriately disposed within pages 10c, 10d, 10e, respectively. Suitable energizing and communicating connections, shown by dots and short lines, but not specifically labeled in FIG. 2, connect circuitry 12 with the page-embedded light and sound structures. All of this just-described electrical structure is referred to herein collectively as power-ready, electronic, interaction-response structure.

These just-mentioned light and sound structures may include components such as appropriately distributed light-emitting diodes (or other low-power light sources), loudspeakers, and computer-driven electronic display screens, all appropriately associated, in various ways, some of which will now be suggested, with learner readable-viewable content appearing on the surfaces of the pages in book 10. Circuitry 12, and the electronic elements just mentioned which are embedded within the pages of book 10, are referred collectively herein as power-ready, electronic interaction-response structure. As will also become apparent to those generally skilled in the art, there are many useful ways in which this interaction-response structure, and specifically its page-contained components, may be deployed to provide effective confirmatory/non-confirmatory responses to young learner-provided answers to questions posed on the pages in book 10.

Focusing attention specifically on FIG. 3 in the drawings, here what is illustrated is one specific type of book-contained subject matter prepared in the context of teaching young children to recognize, correctly, different basic geometric shapes. Accordingly, appropriately presented graphically on representative page 10d in book 10 are five, different, fundamental geometric shapes (or elements), including a non-square rectangle 14, a triangle 16, a square 18, a large circle 20, and a small circle 22, each of which constitutes what is referred to herein as an answer, and all of which collectively form what is characterized herein as a field 24 of undistinguished answers. These visual, graphical elements/answers are provided on, and in associated with, book page 10d in relation to a combined lesson-specific question and response invitation 26 which asks a young learner to identify and touch the triangle.

While there are many different ways in which the various proposed graphical answers pictured on page 10d could be prepared and presented for confirmatory and/or non-confirmatory response to a student's answer to the relevant posed question, in the particular illustration now being given, each of the five graphical answers is sensitized to trigger a type of response when touched by a learner, but only triangle 16 is sensitized to become specially highlighted, as by lighting and/or sound, to indicate that it is the correct, or best, answer to the posed question. Thus, in the illustration now being given, elements 14, 18, 20, 22 are sensitized to trigger a loudspeaker (spoken sound) response which says something such as "Uh-oh! Try again.", while triangle element 16 is further sensitized to produce both a dramatic, light and sound, correctness-confirming response. Such a confirming response might take the form of a variety of different lighting behaviors, coupled with a loudspeaker-presented statement such as "Yes! Good job! Let's try the next page!".

If a student experiences a predetermined number of answer failures, page 10d (and all other pages could have this feature) provides a button-contact HELP function shown at 27 in FIG. 3. This HELP function is furnished, for example, by an appropriately delivered loudspeaker message to the learner.

In the context of such "correctness sensitizing" of triangle 16, on the right side of FIG. 3, three of many different lighting-type, dramatic responses are generally illustrated, one of which includes appropriate lighting up of the entire perimeter 16a of triangle 16, another of which involves a perimeter-traveling-light scheme, such as is suggested by dashed arrow 16b, and yet another of which features a full spatial light-up 16c (illustrated by shading) of the entire triangle.

The particular manner of providing and presenting such a lighting (and/or sound if desired) correctness confirmatory response is a matter of choice for a book designer choosing to implement the present invention. For example, with regard to page 10d and its illustrated subject matter, each of graphical elements 14-22, inclusive, could be prepared as window structures through which different lighting displays might be presented by imbedded lighting elements. Or, as described above, only triangle 16 might be so prepared. Additionally, it is entirely possible that one, or the entire field, of the answer elements might be presented on a page-embedded, computer-driven display screen, such as the display screen shown at 28 in FIGS. 4(a) and 4(b). As an illustration, and continuing this display-possibility description with reference to graphical-answer triangle 16, this triangle might be presented on a display screen, such as screen 28, as a computer-created image, like that shown at 16A in FIG. 4(a). When a student responds with the correct answer, computer circuitry, such as circuitry 12, could be employed to cause some form of special visual behavior to occur with respect to image 16A. If a student responds with an incorrect answer, and looking now at FIG. 4(b), computer circuitry 12 could cause the image 16A to vanish and to be replaced by words such as the words "TRY AGAIN".

Describing a little bit further the possibility of constructing book 10 so that questions, invitations, individual answers and fields of answers might be controlled entirely by computer circuitry, such as circuitry 12, one should recognize that book 10 could become entirely a pre-programmable book structure which could handle a wide variety of different learning subjects at the choice of a teacher. Thus, a teacher could program such a book to include a specific set of learning subjects in a manner whereby display screen on pages in the book are pre-armed with appropriate answer images, such as the geometric answer images seen in FIG. 3 on representative book page 10d.

Figure 7:
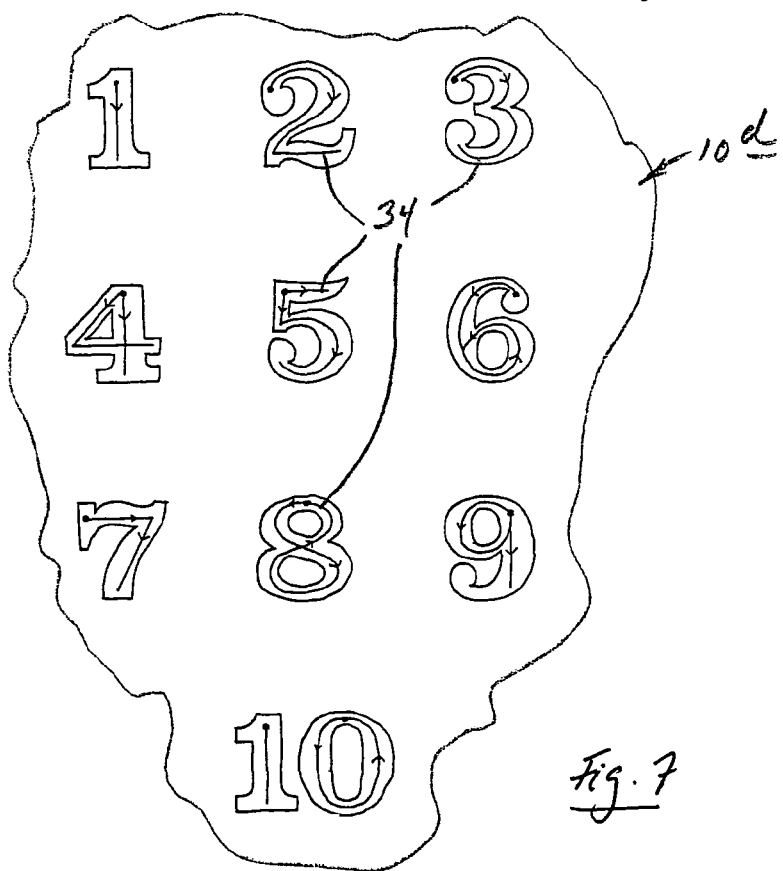
FIG. 7 is a fragmentary book page illustrating Arabic number-recognizing subject matter.

Turning attention for just a moment now to FIGS. 6 and 7, here, two different areas of learning questions are provided, with FIG. 6 illustrating questions relating to recognition of various animals, and FIG. 7 illustrating the subject of recognition of different Arabic numbers in the range 1-10, inclusive. Darkened highlighting shown at 30 in FIG. 6, a dashed line shown at 32 in FIG. 6, and arrow tracer lines, such as those shown at 34, 36 in FIG. 7, generally describe styles for response-highlighting which might be provided to different kinds of answers to questions given by a young learner in relation to the subject areas illustrated in FIGS. 6 and 7.

FIG. 5 in the drawings shows and suggests another approach to implementing the present invention. Here, a wireless, digital-communication-network form of the invention is shown generally at 36. This network includes a wireless communication connection, represented by a dash-double-dot line 38, which extends between and interconnects two digital computer circuits pictured by dashed blocks 40, 42, which circuits are embedded in book structures 44, 46, respectively. Book 44 represents a learner book structure, and book 46 a like, teacher book structure. These two books, each entirely self-contained in the sense of fully including all learning, electronic, and digital computing elements, relate to one another as learning/teaching companions.

Such a networked system, wherein a communication pathway, also referred to herein as a book-form-to-book-form network connection, while described and illustrated herein in the form of a wireless pathway, may be made in a variety of different ways, offers a rich opportunity for teaching interactive engagement between a teacher and student in the context of electronically responsive book structures such as earlier-described book 10.

From the description which has thus been given herein, it should be apparent that a very unique electronic, special, entertaining, and indeed highly effective, graphical-subject area-learning system is proposed by the present invention for teaching young learners important recognition skills with regard to a wide variety of learning subjects. Embodiments of the invention may take on a number of different book-like forms (book-form structures), including computer-virtual book-forms with virtual pages (screen displayable and user-interface manipulable), and highly sophisticated digital network forms, which enable a learner and teacher to interact with one another during a learning session. By using immediate and dramatic light and/or sound responses to a student's answering behavior, which responses may themselves take on a very wide variety of characteristics, a young learner may be presented with a very entertaining and stimulating sight and sound learning environment.

Accordingly, while several embodiments of the invention have been illustrated and described herein, it is appreciated that variations and modifications may be made without departing from the spirit of the invention.

We claim:

1. A learner-teacher, book-form, electronic learning system configured with companion, learner-useable and teacher-useable book-form structures, each having (a) a spine, (b) plural, hand-turnable pages joined to the spine, and (c) spine-and-page-embedded and operatively interconnected electronics, said system comprising a learner-useable book-form structure having plural, hand-turnable pages hinged to a spine, each page including at least one lesson-specific question, and for each such question an associated field containing a plurality of nominally undistinguished, learner-selectable, image-based answers among which there is at least one best answer, with respect to each such question, an invitation to a learner to respond to that question by interacting in a defined way with any selected one of the relevant field-associated answers, power-ready, electronic, interaction-response structure including (a) electrical power and other circuitry entirely contained and embedded within the confines of the spine and pages in said learner-useable book-form structure, and (b) energizing and communicating connections associated with said circuitry extending as operative, circuitry interconnections between and into said spine and pages, said interaction-response structure being operable, when a learner interacts with a selected answer in the relevant field, to produce a light and/or sound correctness-confirming response of one style when the selected answer is the best answer, and a light and/or sound noncorrectness-announcing response of another style when the selected answer is another, incorrect answer, a teacher-useable book-form structure which is a companion to said learner-useable book-form structure and which also possesses plural, hand-turnable pages hinged to a spine, digital computer structure embedded, and entirely contained, within the confines of the spine and pages in each of said book-form structures, said digital computer structure, with respect to said learner book-form structure, forming a portion of said other circuitry, and computer network structure operatively, interactively and directly linking the teacher-useable and learner-useable book-form structures, per se, via a direct, book-form-to-book-form network connection which exists between the digital computer circuit-structure which is embedded in the learner-useable book-firm structure, and the digital computer structure which is embedded in the teacher-useable book-form structure, thereby to enable interactive learner guidance, on a dedicated, network-based, one-to-one basis by and with a teacher.

2. The system of claim 1, wherein, with respect to such a field of answers, the at least one best answer is, with respect to such a field of answers, a light and/or sound highlightable, but nominally unhighlighted, answer, and a correct learner selection of that one answer causes light and/or sound highlighting of that answer.

3. The system of claim 1, wherein said interaction-response structure includes a computer-driven display screen operable to present interaction-response, attention-getting visual displays.

4. The system of claim 1, wherein a light and/or sound response includes, where light is involved, at least one of (a) a static lighted perimeter outline of an answer, (b) a traveling lighted perimeter outlining of an answer, (c) a spatial area lighting associated with an answer, (d) a traveling light display associated with an answer, and (e) a transition lighting effect associated with an answer.

* * * * *